(12) United States Patent
Biggs et al.

(10) Patent No.: US 8,451,026 B2
(45) Date of Patent: May 28, 2013

(54) INTEGRATED CIRCUIT, METHOD OF GENERATING A LAYOUT OF AN INTEGRATED CIRCUIT USING STANDARD CELLS, AND A STANDARD CELL LIBRARY PROVIDING SUCH STANDARD CELLS

(75) Inventors: John Philip Biggs, Teversham (GB); James Edward Myers, Bottisham (GB); David William Howard, Cambridge (GB); David Walter Flynn, Cambridge (GB); Carsten Tradowsky, Karlsruhe (DE)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 13/067,182

(22) Filed: May 13, 2011

(65) Prior Publication Data
US 2012/0286858 A1  Nov. 15, 2012

(51) Int. Cl.
H01L 25/00  (2006.01)
G06F 17/50  (2006.01)

(52) U.S. Cl.
USPC .............. 326/101; 326/41; 326/47; 716/120

(58) Field of Classification Search
USPC ........ 326/37–41, 47, 101; 716/116, 118–121, 716/126
See application file for complete search history.

(56) References Cited

U.S. PATENT DOCUMENTS

| | | | |
|---|---|---|---|
| 7,508,256 B2 * | 3/2009 | Hillman et al. | 327/565 |
| 7,940,080 B2 * | 5/2011 | Ogata | 326/38 |
| 8,143,914 B2 * | 3/2012 | Ogata | 326/41 |
| 8,191,026 B2 * | 5/2012 | Motomura | 716/119 |
| 2003/0023935 A1 * | 1/2003 | McManus et al. | 716/1 |
| 2007/0096154 A1 * | 5/2007 | Shimbo et al. | 257/207 |
| 2009/0113370 A1 * | 4/2009 | Yoshinaga | 716/11 |
| 2009/0138840 A1 * | 5/2009 | Ichiryu et al. | 716/17 |
| 2009/0140800 A1 * | 6/2009 | Hillman et al. | 327/566 |

* cited by examiner

*Primary Examiner* — Thienvu Tran
(74) *Attorney, Agent, or Firm* — Nixon & Vanderhye P.C.

(57) ABSTRACT

An integrated circuit, a method of generating a layout of such an integrated circuit using standard cells, and a standard cell library providing such standard cells, are disclosed. The method of generating the layout comprises forming a plurality of rows, and populating each row with a plurality of standard cells chosen in dependence on the functional components required by the integrated circuit, each standard cell having its abutment area abutting the abutment area of at least one adjacent standard cell in the row. Within each row, each standard cell in that row is arranged to have a voltage connection area that is aligned with a common routing track, but with each standard cell having its voltage connection area configured so as not to extend across the entire width of the standard cell. Within each row, for each standard cell in the row, the voltage connection area of that standard cell is then connected to one of a plurality of voltage supplies having regards to a voltage requirement of the corresponding functional component defined by the standard cell, and independent of the voltage supply to which each adjacent cell in the row is connected. This provides a particularly flexible mechanism for placing standard cells during the layout operation, since standard cells that are required to run off the same voltage supply no longer need to be placed together.

19 Claims, 12 Drawing Sheets

VIEW ALONG A-A IN FIG.3 SHOWING DEPTH

INTEGRATED CIRCUIT, METHOD OF GENERATING A LAYOUT OF AN INTEGRATED CIRCUIT USING STANDARD CELLS, AND A STANDARD CELL LIBRARY PROVIDING SUCH STANDARD CELLS

FIELD OF THE INVENTION

The present invention relates to the field of integrated circuits, and in particular to techniques for generating the layout of such integrated circuits.

DESCRIPTION OF THE PRIOR ART

In the design of semiconductor integrated circuits, it is known to provide automated tools which use a functional design of a planned integrated circuit (for example in the form of a gate level netlist or a Register Transfer Language higher level representation of the design) and a cell library providing a set of standard cells (the standard cells defining functional components, and being "building blocks" for putting together the layout of the integrated circuit according to the functional design) in order to generate the layout of an integrated circuit.

Typically, the standard cells are arranged in rows by the automated tool and (considering the rows as running horizontally) the left and right boundaries of each standard cell are such that any given standard cell may be placed next to any other given standard cell. Thus the automated tool has free choice in which standard cells are placed where in order to fulfil the requirements of the functional design with a low routing overhead.

The left and right boundaries of each standard cell are typically defined by the abutment box (also referred to herein as the abutment area) of that standard cell, the abutment box having a height dictated by (typically equal to) the row height and having a width that is one or more unit widths, with the left and right boundaries being defined by the width of the abutment box.

Standard cells typically define voltage rails along the top and bottom of the standard cell, positioned so as to align with the corresponding voltage rails provided in all of the other standard cells, such that when a plurality of standard cells are arranged in to a row, the voltage rails within each standard cell abut to form voltage rails running along the entire top and bottom of the row. Traditionally, these two rails provide a power rail and a ground rail to the standard cells in that row. Accordingly, each of the components implemented by standard cells within a particular row will typically be driven from the same power and ground supplies.

However, using such standard cells in low power implementations requires that cells with different power supplies (whether multi-voltage or power gated) are physically separated in to monolithic voltage areas. This provides a significant constraint on ASIC designers, as it dictates the size, shape and/or connectivity of blocks which are eligible for power management techniques.

Within integrated circuits that use both switched and unswitched power supplies, it is known to connect the switched power supply to one of the above-described rails, and then to provide a subset of special standard cells which provide the power rail across their width (in order to support their placement within a row whilst enabling the power rail to exist across the entirety of the row), but which are provided with a separate dedicated pin unaligned with the power rail (for example inboard of the power rail positioned within the standard cell) to enable an always on power supply to be provided to that cell. However, such an approach lacks flexibility, since special cells need to be designed, and they still require the provision of the power rail within those cells for compatibility with adjacent cells, even though they may not take a power supply from that rail.

Another way to implement interleaved power domains is to create alternating rows of each power domain (disjoint single/dual row voltage areas) such that cells can be coarsely distributed, but must actually snap to their dedicated rows. However, such an approach perturbs placement and lengthens wires, and hence whilst potentially useful for some implementations, for example for the components providing parts of an interconnect structure, such techniques are not typically useful for performance critical designs, for example central processing units (CPUs).

Accordingly, it would be desirable to develop a technique which provides improved flexibility for connection of voltage supplies to individual standard cells.

SUMMARY OF THE INVENTION

Viewed from a first aspect, the present invention provides a method of generating a layout of an integrated circuit, comprising the steps of forming a plurality of rows within which to provide functional components of the integrated circuit, each row having a predetermined row height; providing a standard cell library, each standard cell within the standard cell library defining a corresponding functional component, each standard cell having an abutment area comprising a height dictated by the row height, and a width; populating each row with a plurality of standard cells chosen in dependence on the functional components required by the integrated circuit, each standard cell having its abutment area abutting the abutment area of at least one adjacent standard cell in the row; for each row, providing a routing track running along that row; within each row, arranging for each standard cell in that row to have a voltage connection area that is aligned with said routing track, but with each standard cell in that row having said voltage connection area configured so as not to extend across the entire width of the standard cell; providing a plurality of voltage supplies; and within each row, for each standard cell in said row, connecting the voltage connection area of that standard cell to one of the plurality of voltage supplies having regard to a voltage requirement of the corresponding functional component defined by that standard cell, and independent of the voltage supply to which each adjacent standard cell in the row is connected.

In accordance with the present invention, each standard cell in a row is arranged to have a voltage connection area that is aligned with a particular routing track, and within each standard cell the voltage connection area is configured so as not to extend across the entire width of the standard cell. Accordingly, the voltage connection area in one standard cell does not abut against the voltage connection area in the adjacent standard cells within the row, and accordingly a common rail across the row is not formed. A plurality of voltage supplies are then provided, and for each standard cell in the row, the voltage connection area of that standard cell is connected to one of the plurality of voltage supplies having regard to a voltage requirement of the functional component defined by that standard cell. Since the voltage connection areas within each standard cell in the row are aligned but not abutting, this enables the voltage supply for each standard cell to be selected independently. Accordingly, a great deal of flexibility is provided when generating the layout of the integrated circuit, since the placement of individual standard cells is not constrained by the voltage supply that they require. In particular, standard cells implementing components that will all be run off the same voltage supply no longer need to be grouped together in to a monolithic block, and instead within any particular row a variety of standard cells can be provided, running off a variety of different voltage supplies.

For the purposes of the present application, the term "row" is not intended to imply a requirement for a horizontal arrangement, and indeed whilst the rows may run horizontally across the integrated circuit, they may alternatively run vertically through the integrated circuit.

The above described method of generating a layout of an integrated circuit can be extended in to a method of manufacturing an integrated circuit by performing an additional step of outputting the layout data generated by the above method, and then manufacturing the integrated circuit in accordance with that layout data.

There are a number of ways in which connections can be made between the voltage connection area in individual standard cells and the required voltage supply in a way which avoids contact with other connections made in other standard cells to potentially different voltage supplies. In one embodiment, the method further comprises: providing a plurality of conductive connector configurations, each conductive connector configuration having an associated voltage supply from said plurality of voltage supplies and facilitating a voltage connection between said voltage connection area and said associated voltage supply; and for each standard cell in said row, said connecting step comprising determining which voltage supply to connect to, and using the associated conductive connector configuration to provide the voltage connection between the voltage connection area and said determined voltage supply.

In one embodiment, one voltage supply of said plurality of voltage supplies is positioned such that use of the associated conductive connector configuration results in a conductive connector extending between the voltage connection area and said one voltage supply in a first direction, and at least one other voltage supply of said plurality of voltage supplies is positioned such that use of the associated conductive connector configuration results in a conductive connector extending between the voltage connection area and that other voltage supply at least partially in a second direction orthogonal to the first direction.

In one particular embodiment, the first direction is perpendicular to a plane defined by the abutment area. In one particular embodiment, one voltage supply can hence be provided directly above (i.e. overlying) the voltage connection area of each standard cell in a row, provided for example in a different layer above the layer providing the voltage connection areas, and then conductive connectors can be provided in the depth direction to directly connect selected voltage connection areas in the row to that voltage supply. Each of the other voltage supplies is then provided offset to the voltage connection areas so that their associated conductive connectors extend at least partially in a direction orthogonal to the depth direction.

In one embodiment, each standard cell defines a plurality of layers including a first metal layer, and said voltage connection area is provided in said first metal layer, the method further comprising: providing an intervening voltage rail in said first metal layer in a gap between a first row and a second row of said plurality of rows; coupling a first voltage supply from said plurality of voltage supplies to said intervening voltage rail; and during said connecting step, connecting the voltage connection area of a standard cell to said first voltage supply by placing a conductive connector in said first metal layer between that voltage connection area and the intervening voltage rail.

Hence, in such embodiments, the required conductive connector between the first voltage supply and a selected voltage connection area can be provided entirely in the first metal layer.

In one such embodiment, the method further comprises: providing a second voltage supply from said plurality of voltage supplies in a second metal layer separated from said first metal layer in a depth direction perpendicular to a plane defined by the abutment area; and during said connecting step, connecting the voltage connection area of a standard cell to said second voltage supply by placing a conductive connector between the voltage connection area in the first metal layer and the second voltage supply in the second metal layer.

Hence, in this embodiment, whilst the conductive connector between a voltage connection area and the first voltage supply can be provided entirely in the first metal layer, the conductive connector between a voltage connection area and the second voltage supply extends between the first metal layer and the second metal layer.

In one particular embodiment, the method further comprises: providing the second supply voltage by a voltage supply line running in the second metal layer aligned with said routing track; and during said connecting step, creating at least one via to provide the conductive connector between the voltage connection area in the first metal layer and the second voltage supply in the second metal layer.

This provides a particularly simple and space efficient implementation, where the conductive connectors associated with the first voltage supply and the second voltage supply are provided tangentially with respect to each other. Whilst some space needs to be allowed between two adjacent rows to provide for the intervening voltage rail supporting the first voltage supply, the second voltage supply is provided in the second metal layer aligned with the routing track, and hence no space between the rows is required to support the second voltage supply.

In some embodiments, it may be desirable to provide more than two voltage supplies. In one embodiment supporting such multiple voltage supplies, each standard cell defines a plurality of layers including a first metal layer, and said voltage connection area is provided in said first metal layer, the method further comprising: providing a plurality of intervening voltage rails in a second metal layer separated from said first metal layer in a depth direction perpendicular to a plane defined by the abutment area, said plurality of intervening voltage rails being positioned in a gap between a first row and a second row of said plurality of rows; coupling a different voltage supply from said plurality of voltage supplies to each said intervening voltage rail; and during said connecting step, connecting the voltage connection area of a standard cell to one of said intervening voltage rails by using a conductive connector that partially extends in said first metal layer into said gap between said first row and said second row.

Hence, a plurality of intervening voltage rails are positioned in the gap between rows, with those intervening voltage rails being provided in the second metal layer so as to allow conductive connectors to be routed to each of those intervening voltage rails without contacting other intervening voltage rails. In one particular embodiment, each such conductive connector extends partially in the first metal layer to a point underlying the required intervening voltage rail, and then a via is provided to form the remainder of the conductive connector between the intervening voltage rail in the second metal layer and the other part of the conductive connector in the first metal layer.

In a space efficient implementation of this general technique, one of the voltage rails in the second metal layer can be arranged to directly overlie the routing track with which the voltage connection areas are aligned, such that the conductive connector for that voltage rail can be provided solely by vias extending between the voltage connection area in the first metal layer and the voltage rail in the second metal layer.

One structure of an integrated circuit that has traditionally been difficult to provide an independent voltage supply for is an interconnect structure used to provide a bus network interconnecting multiple blocks of the integrated circuit. Due to the distributed nature of the interconnect structure, it is typically desirable to place the various interconnect components forming the interconnect structure in a distributed manner having regards to timing constraints associated with signals transferred over the interconnect structure. However, when the interconnect components are spread out over the integrated circuit in a distributed manner, it is very difficult using traditional techniques to provide a separate voltage supply for those interconnect components. In particular, in accordance with standard designs, such interconnect components are constrained to have the same voltage supply as the adjacent components provided within the rows in which those interconnect components reside. Traditionally, if it was desired to power gate certain interconnect components of the interconnect structure it was necessary to group of all of those interconnect components together, but of course this then causes problems with regard to meeting the timing requirements within the interconnect.

However, in accordance with embodiments of the present invention, it is possible to place those interconnect components having regard to the timing constraints, and to still power gate those interconnect components using the same voltage supply even though those components are in different rows, due to the voltage connection areas within the standard cells not extending across the entire width, and hence not abutting the voltage connection areas in adjacent cells.

Accordingly, in one embodiment, the method further comprises: providing a plurality of standard cells across multiple of said rows to collectively implement at least one channel of an interconnect structure within the integrated circuit; and connecting each of those standard cells implementing the at least one channel to the same voltage supply from said plurality of voltage supplies.

As will be understood by those skilled in the art, interconnect structures in modern data processing systems often adopt a split transaction protocol providing multiple separate channels of communication. For example, the AXI (Advanced eXtensible Interface) protocol developed by ARM Limited, Cambridge, United Kingdom, provides a number of channels over which information and data can be transferred, these channels comprising a read address channel for carrying address transfers of read transactions, a write address channel for carrying address transfers of write transactions, a write data channel for carrying data transfers of write transactions, a read data channel for carrying data transfers of read transactions, and a write response channel for returning transaction status information to a master device at the end of a write transaction, such transaction status information indicating for example whether the transaction completed successfully, whether an error occurred, etc. Using the techniques of the above described embodiments, individual channels within the interconnect structure can be connected to different voltage supplies. Hence, for example, by distributing two switched supplies and one shared ground supply, two channels of an interconnect could be placed in the same floor plan region but power gated independently.

The plurality of voltage supplies to which the aligned, but separated, voltage connection areas of the standard cells in a row are connected can take a variety of forms. In one embodiment, the plurality of voltage supplies provide multiple different voltage levels. Alternatively, the plurality of voltage supplies may comprise both an unswitched version and at least one switched version of a particular voltage level. In one embodiment the plurality of voltage supplies may provide a plurality of power supplies, whilst in another embodiment the plurality of voltage supplies may provide a plurality of ground supplies.

In one particular embodiment, the method further comprises: for each row, providing an additional muting track running along that row; within each row, arranging for each standard cell in that row to have an additional voltage connection area that is aligned with said additional routing track, but with each standard cell in that row having said additional voltage connection area configured so as not to extend across the entire width of the standard cell; providing a plurality of additional voltage supplies; and within each row, for each standard cell in said row, connecting the additional voltage connection area of that standard cell to one of the plurality of additional voltage supplies having regard to a voltage requirement of the corresponding functional component defined by that standard cell, and independent of the additional voltage supply to which each adjacent standard cell in the row is connected.

Hence, in accordance with such embodiments, the technique of the present invention is replicated in two places within each standard cell, typically at or near the top and bottom of the standard cell. In one such embodiment, the plurality of voltage supplies may provide a plurality of power supplies, and the plurality of additional voltage supplies may provide a plurality of ground supplies, such that the same technique can be applied independently to both the power supplies and the ground supplies if desired.

In one embodiment, at least one standard cell in at least one of said plurality of rows is arranged to have a further voltage connection area separated from but aligned with said voltage connection area, such that said voltage connection area and said further voltage connection area are both aligned with said routing track. For each of said at least one standard cells, the further voltage connection area is then connected to a different one of the plurality of voltage supplies to the voltage supply that is connected to the voltage connection area of that standard cell.

This can be useful in a variety of situations, for example in certain standard cells which require two different operating modes of operation. As a particular example, the voltage supplies required by a retention flip-flop for both the normal mode of operation and the retention mode of operation can be provided using the two different voltage connection areas.

Whilst in one embodiment such standard cells have two voltage connection areas aligned with each other and with the routing track, such an approach can also be extended to more than two voltage connection areas if desired, provided there is space to provide separation between each of the voltage connection areas and for the sum of the voltage connection areas to not extend across the entire width of the standard cell.

Viewed from a second aspect, the present invention provides an integrated circuit comprising: a plurality of voltage supplies; a plurality of rows of functional components, each row having a row height and having its functional components defined by a corresponding series of standard cells, each standard cell having an abutment area comprising a height dictated by the row height, and a width, and each standard cell having its abutment area abutting the abutment area of at least one adjacent standard cell in the row; a routing track provided for each row and running along that associated row; within each row, each standard cell having a voltage connection area that is aligned with said routing track, but with each standard cell in that row having said voltage connection area configured so as not to extend across the entire width of the standard cell; and within each row, for each standard cell in said row, the voltage connection area of that standard cell being connected to one of the plurality of voltage supplies having regard to a voltage requirement of the corresponding functional component defined by that standard cell, and independent of the voltage supply to which each adjacent standard cell in the row is connected.

Viewed from a third aspect, the present invention provides a standard cell library comprising a plurality of standard cells, each standard cell representing a functional component to be provided within a row defined on an integrated circuit, each standard cell comprising: an abutment area having a predefined height dictated by a height of said row within the integrated circuit, and a width, each standard cell being arranged such that when deployed within said row its abutment area abuts the abutment area of at least one adjacent standard cell in the row; a definition of the functional component to be provided within the abutment area; and a voltage connection area that is positioned such that when the standard cell is deployed within the row, said voltage connection area is aligned with corresponding voltage connection areas in the other standard cells deployed within the row, and is aligned with a routing track passing along the row; the voltage connection area being configured so as not to extend across the entire width of the standard cell, thereby allowing, when a plurality of voltage supplies are provided for the integrated circuit, the voltage connection area of the standard cell to be connected to one of the plurality of voltage supplies having regard to a voltage requirement of the corresponding functional component defined by that standard cell, and independent of the voltage supply to which each adjacent standard cell in the row is connected.

Such standard cells that have voltage connection areas that do not extend across the entire width of the standard cell, but that are positioned so that they align with corresponding voltage connection areas in other standard cells when deployed within a row, will also be referred to herein as "de-railed" standard cells, since such standard cells can be formed by taking a pre-existing standard cell, and de-railing the existing voltage rail structure within the standard cell so as to form the required voltage connection area.

Viewed from another aspect, the present invention provides a computer program on a non-transitory storage medium, providing a standard cell library in accordance with the third aspect of the present invention. Such a computer program can be run on an automated design tool used to produce the layout of an integrated circuit from functional data representing the circuit elements and connections between the circuit elements of the required integrated circuit. In particular, the automated design tool selects standard cells from the standard cell library and places them in to a series of rows in order to implement the required functionality of the integrated circuit.

Viewed from another aspect, the present invention provides an integrated circuit comprising: a plurality of voltage supply means; a plurality of rows of functional means, each row having a row height and having its functional means defined by a corresponding series of standard cell means, each standard cell means having an abutment area comprising a height dictated by the row height, and a width, and each standard cell means having its abutment area abutting the abutment area of at least one adjacent standard cell means in the row; routing track means provided for each row and running along that associated row; within each row, each standard cell means having a voltage connection area means aligned with said routing track means, but with each standard cell means in that row having said voltage connection area means configured so as not to extend across the entire width of the standard cell means; and within each row, for each standard cell means in said row, the voltage connection area means of that standard cell means for connecting to one of the plurality of voltage supply means having regard to a voltage requirement of the corresponding functional means defined by that standard cell means, and independent of the voltage supply means to which each adjacent standard cell means in the row is connected.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
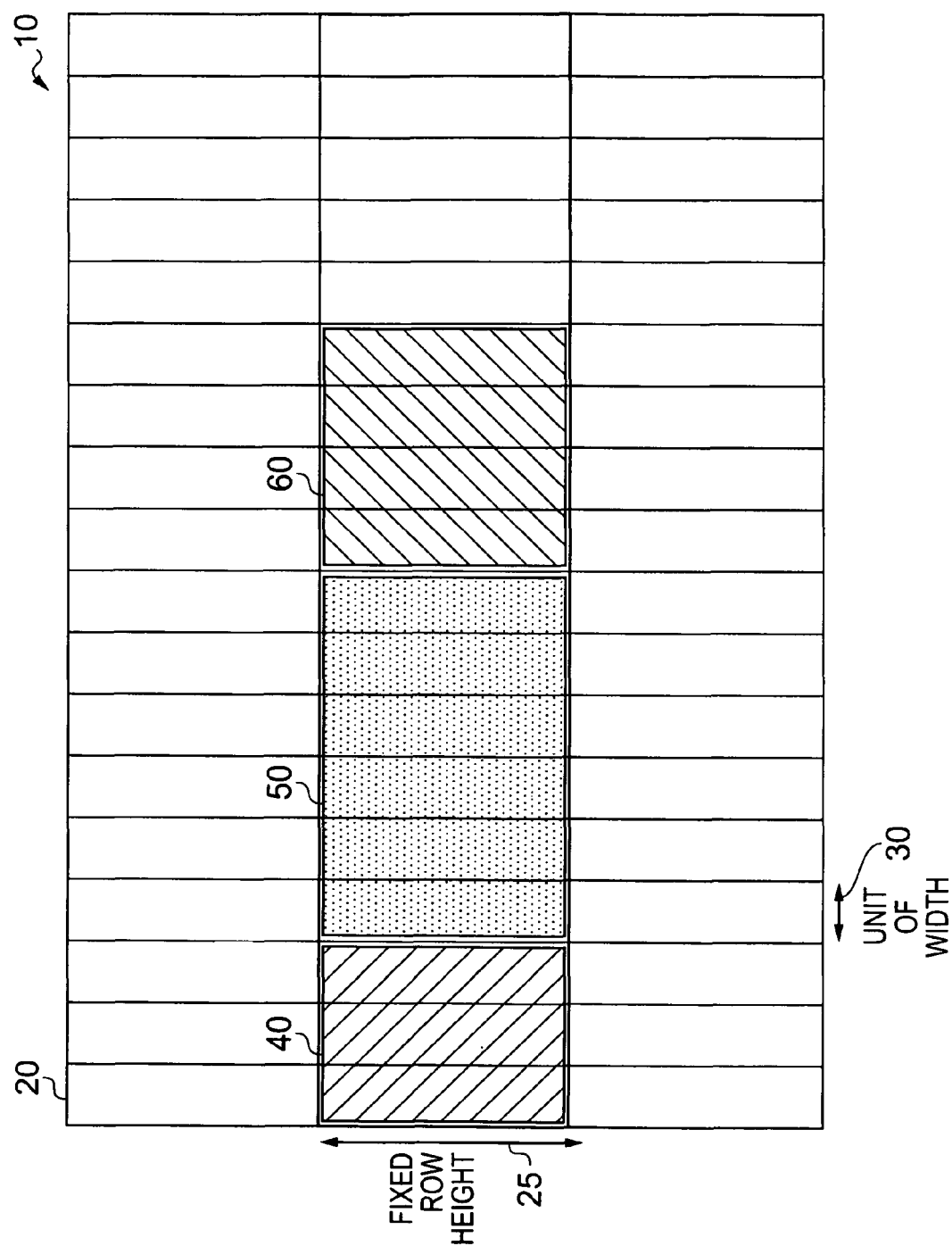
FIG. 1 is a diagram schematically illustrating how standard cells are placed within rows during the process of generating a layout for an integrated circuit.

FIG. 1 schematically illustrates a portion 10 of an integrated circuit layout, the portion shown having three rows of a fixed row height 25. Each row comprises a series of blocks 20 with a fixed unit of width 30. Each standard cell in the standard cell library is arranged to have a height equal to the row height 25, and to have a width which can vary between cells but is a multiple of the unit width 30. Standard cells are then placed in to each row having regards to the required circuit elements and connections between those circuit elements required by the integrated circuit, with the various standard cells arranged to abut against one another. Hence, for the purpose of illustration, three standard cells 40, 50, 60 are shown located within one of the rows. Each cell has an abutment box whose height is equal to the row height, and whose width is a multiple of the unit width 30, and when placed in to a particular row, the abutment box of a standard cell abuts against the abutment box of an adjacent standard cell. Hence, in FIG. 1, the abutment box of the standard cell 50 abuts against the abutment box of the standard cells 40 and 60.

Figure 2A:
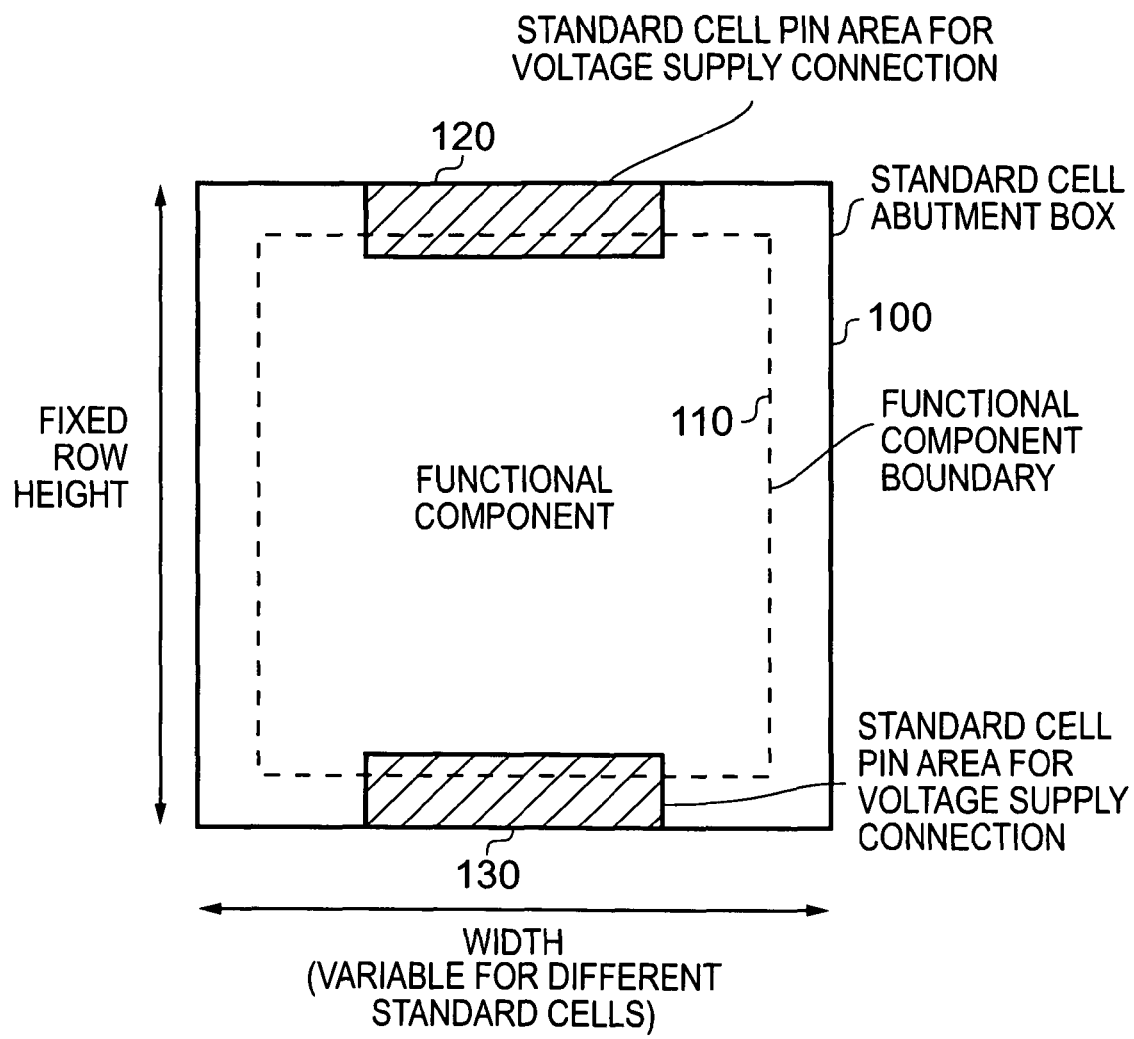
FIG. 2A schematically illustrates a standard cell in accordance with one embodiment.

FIG. 2A schematically illustrates a standard cell in accordance with one embodiment. Within the abutment box 100, a functional component to be represented by the standard cell will be defined. Typically, the constituent parts of the functional component are constrained to lie physically within a functional component boundary 110 provided within the abutment box 100, in order to ensure that when another standard cell is placed abutting the standard cell, no unwanted interactions between the elements of each standard cell will occur. In reality, different elements within the standard cell (e.g. polysilicon, metal, etc.) will have different minimal distances from the abutment box boundary, according to predetermined design rules, and hence the functional component boundary 110 will vary dependent on the element under consideration.

In accordance with the embodiment shown in FIG. 2A, in contrast to prior art standard cells that would typically have rails extending across the entirety of the width at the top and bottom of the standard cell, the standard cell of this embodiment has a pin area 120 (also referred to herein as a voltage connection area) for a voltage supply connection, and a corresponding pin area 130 on the opposing side of the standard cell also for a voltage supply connection. The positioning of these pin areas 120, 130 is arranged so that all of the standard cells in the standard cell library have these pin areas aligned with each other, and in particular aligned with corresponding routing tracks that will be provided within each row. Accordingly, when a series of such standard cells are placed in an abutting arrangement along a row, it will be seen that instead of contiguous rails being provided along the top and bottom of the series of standard cells, separate voltage connection areas 120, 130 in each standard cell are provided which, although aligned with each other, do not abut. This provides significantly improved flexibility when deciding which voltage supply to provide to each standard cell.

In particular, during the place and route process, connections to particular voltage supplies can be made on a cell-by-cell basis so that the voltage supply provided to one standard cell in a row can be chosen independently of the voltage supply provided to adjacent standard cells in the row.

Typically one of the voltage connection areas 120 will be used to provide a power supply connection, whilst the other voltage connection area 130 will be used to provide a ground supply connection.

If desired, during the place and route process one or both of the pin areas 120, 130 can be extended so as to provide a rail extending across the entire width if desired. For example, if both voltage connections areas 120, 130 are extended in this way for all cells in a row, this provides compatibility with a standard arrangement, returning the design to a design that has rails extending across the entirety of the top and bottom of the rows. In addition, in some embodiments, one of the voltage connection areas can be extended whilst the other is left as shown in FIG. 2A. This approach can be used, for example, where it is desired to provide a plurality of different power supply sources, but where it is desired that all of the standard cells in a row share a common ground supply. Hence, in such embodiments, the ground supply connection areas 130 can be extended during the place and route process to extend across the entire width in each of the standard cells along the row, to provide a common ground rail, whilst still providing the earlier-described flexibility with regards to connection of the power supply to each standard cell.

Figure 2B:
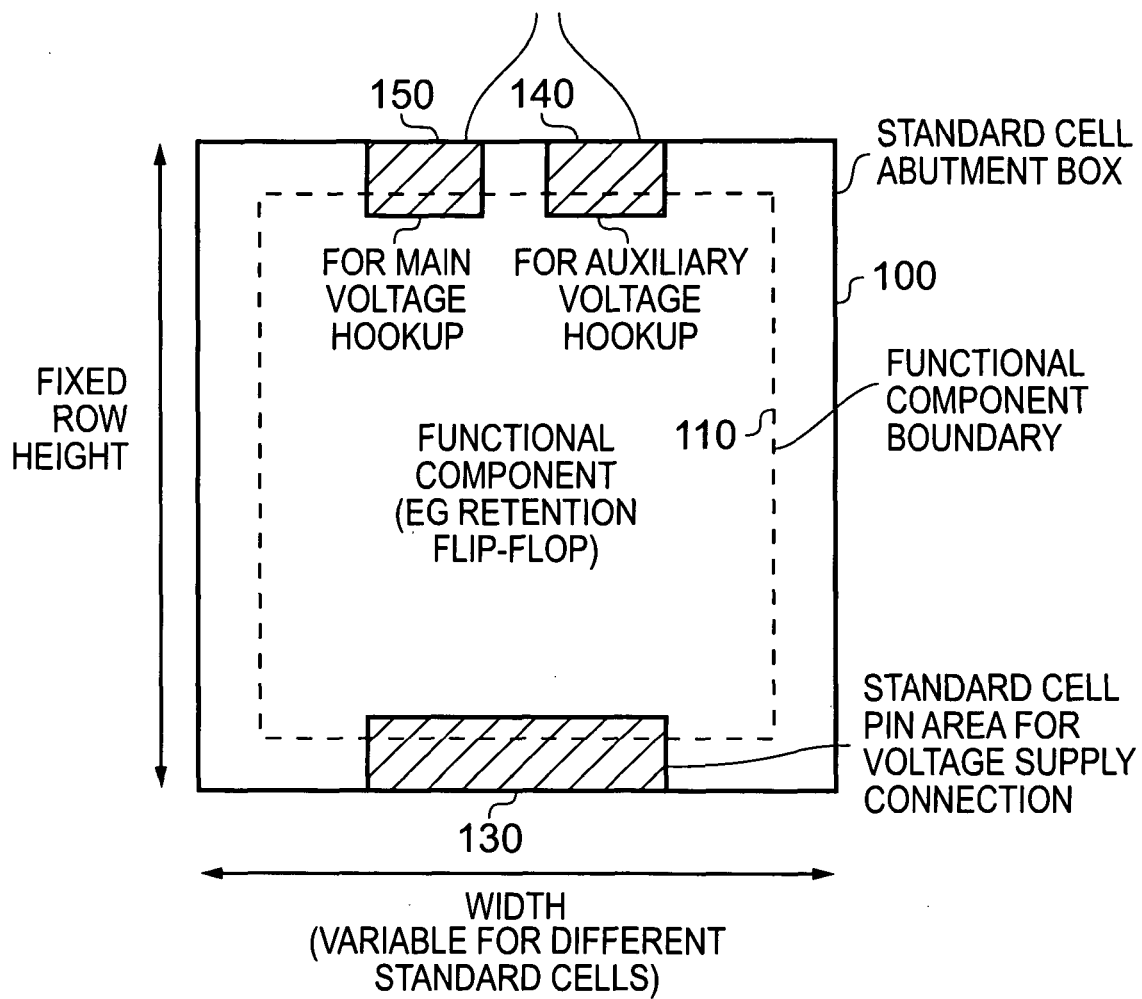
FIG. 2B schematically illustrates a standard cell in accordance with an alternative embodiment.

FIG. 2B illustrates an alternative embodiment where two separate voltage connection areas 140, 150 are provided in alignment with each other within a single standard cell. This can be useful in certain standard cells which require two different operating modes of operation. As an example, a retention flip-flop will have a normal mode of operation where the flip-flop is driven by a main power supply voltage, which in this example may be connected to the voltage connection area 150. However, in a retention mode of operation, a subset of the elements within the flip-flop are connected to an auxiliary voltage supply, as for example can be provided via the connection area 140, whilst the remaining elements are turned off. In a typical prior art design, where rails extend across the entirety of the width at the top and bottom of the standard cells, the main voltage could be connected to the power supply rail, but a separate dedicated connection pin in-board of that rail would typically need to be provided to allow for the retention voltage to be supplied. However, as can be seen from the embodiment of FIG. 2B, all necessary supply voltages can be connected from pin areas which are aligned with each other within the cell, and also aligned with corresponding pin areas in all of the other standard cells along the row, with the individual pin areas being coupled to the required voltage supplies during the place and route process. This provides for much more uniformity of design, whilst supporting a very flexible voltage supply selection during the place and route process.

Figure 3:
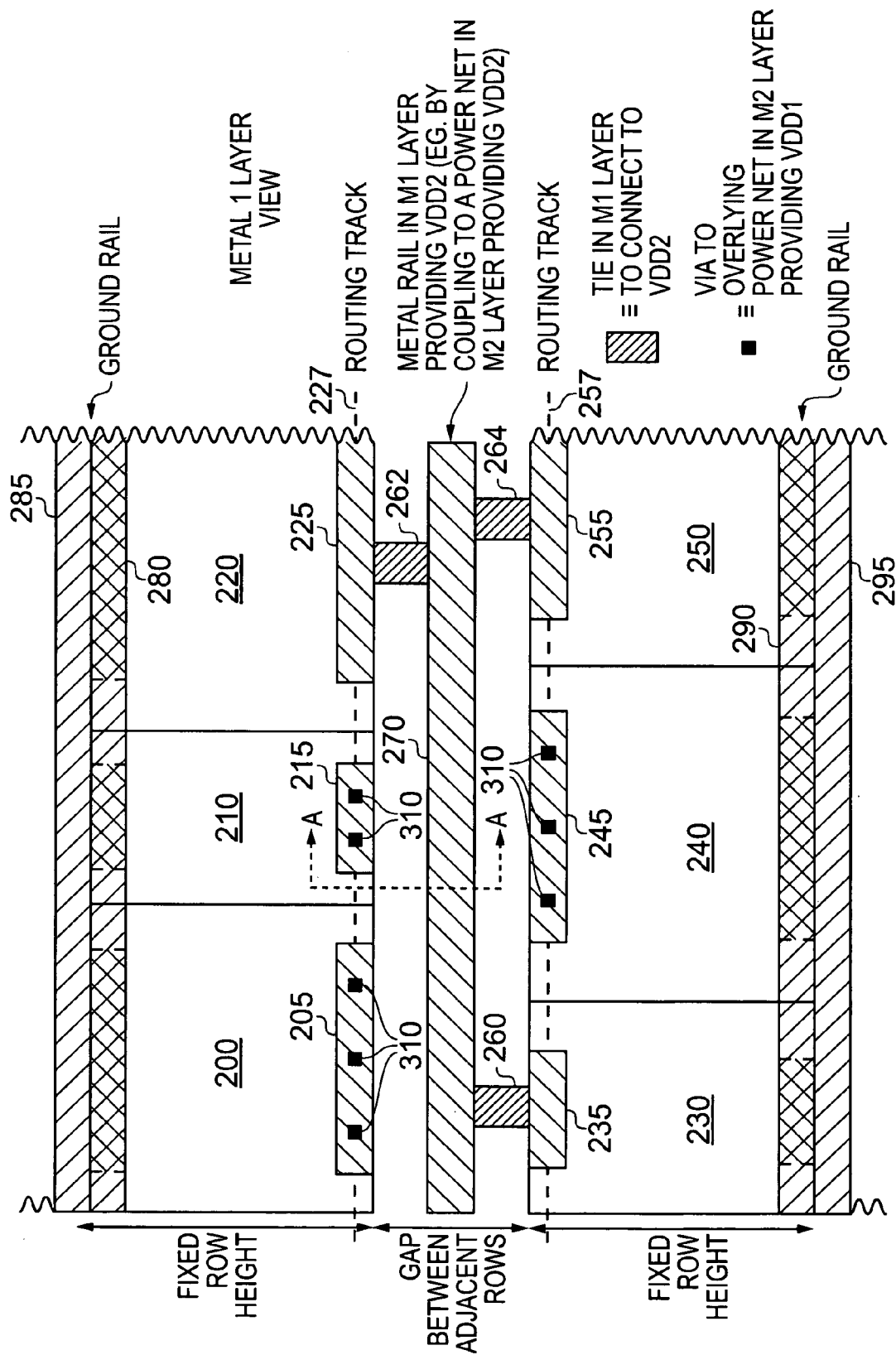
FIG. 3 illustrates how standard cells arranged in two adjacent rows are arranged to have their voltage connection areas coupled to different voltage supplies in accordance with one embodiment.

Typically the voltage connection areas 120, 130, 140, 150 shown in FIGS. 2A and 2B will be provided within a metal one layer, which is typically the top layer provided by the standard cell. FIG. 3 provides a metal one layer view of a portion of two adjacent rows, and in particular shows the standard cells 200, 210, 220 provided in a first row and the standard cells 230, 240, 250 provided in an adjacent row. In accordance with this embodiment, a gap is provided between the adjacent rows to allow a metal rail 270 to be provided in the metal one layer for provision of a particular voltage supply, in this example this voltage supply being referred to as VDD2. In one embodiment, to support the required current through this voltage supply, the metal rail 270 will actually be coupled by a series of vias to an overlying rail or power net in the metal two layer.

As shown in FIG. 3, each of the standard cells 200, 210, 220 has corresponding voltage connection areas 205, 215, 225 for connecting to a power supply, and similarly (using a standard flipped arrangement) the standard cells 230, 240, 250 also have corresponding voltage connection areas 235, 245, 255 for connecting to a power supply. The voltage connection areas 205, 215, 225 are aligned with a routing track 227 in the first row, and the voltage connection areas 225, 245, 255 are aligned with a routing track 257 in the second row. Directly above each of the routing tracks 227, 257, in the metal two layer, a rail or power net is provided to supply a different power supply (in this example VDD1) to the power supply provided by the metal rail 270.

It will be understood that in a typical design there will be many routing tracks running both horizontally and vertically through the design (forming a grid of routing tracks), but for ease of illustration in FIG. 3, only the two routing tracks 227, 257 are indicated.

Having laid out the standard cells in the way illustrated in FIG. 3, a decision as to which power supply to provide to each of the voltage connection areas of each standard cell can be made during the place and route process, having regard to a voltage requirement of the corresponding functional component defined by that standard cell. Hence, in this example, each of the voltage connection areas 225, 235, 255 are connected via corresponding conductive connectors (also referred to herein as ties) 262, 260, 264, respectively, to the metal rail 270 so as to provide the power supply VDD2 to those voltage connection areas. In contrast, the voltage connection areas 205, 215, 245 are connected by conductive connectors in the form of vias 310 to the overlying power net in the metal two layer providing VDD1.

Whilst the corresponding voltage connection areas of each standard cell provided for connection to a ground supply are shown in cross-hatching in the figure, in this example during the layout process the metal one layers were extended so that in the first row a contiguous metal one layer 280 was formed and in the second row a contiguous metal layer 290 was formed. These abut with corresponding contiguous metal layers 285, 295 in adjacent rows, with the rails 280, 285 collectively forming a ground rail and the rails 290, 295 collectively forming a ground rail.

Figure 4A:
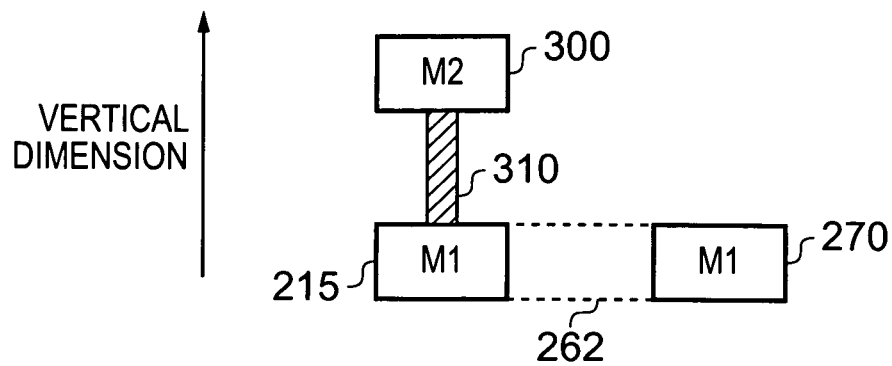
FIG. 4A is an elevation view along the line A-A of FIG. 3.

FIG. 4A is an elevation view along the line A-A in FIG. 3. As can be seen, the voltage connection area 215 is connected via a via 310 to the overlying metal two rail 300 providing the voltage supply VDD1. The voltage connection area 215 is not connected to the metal one rail 270, but the dotted lines between block 215 and block 270 indicate the more distant tie 262 connecting the metal one rail 270 to the voltage connection area 225 behind the voltage connection area 215.

Figure 4B:
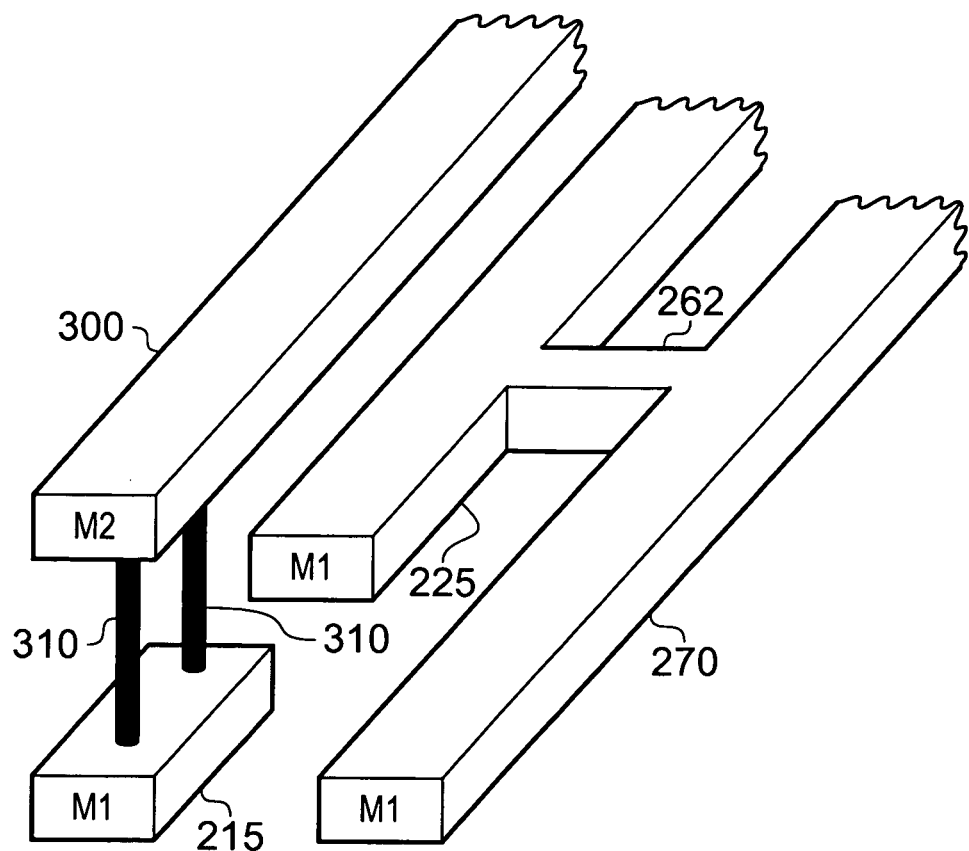
FIG. 4B is a 3D perspective view along the line A-A of FIG. 3.

This is shown more clearly in the 3D perspective view of FIG. 4B where the two metal vias connecting the voltage connection area 215 with the metal two rail 300 are clearly shown, and also the tie 262 is shown between the metal one rail 270 and the power connection area 225.

Whilst not essential, in one embodiment, as discussed earlier, there will also be a corresponding metal two rail above the metal one rail 270 connected to that metal one rail via a series of vias. For simplicity in FIGS. 4A and 4B this overlying metal two layer has been omitted.

Figure 5:
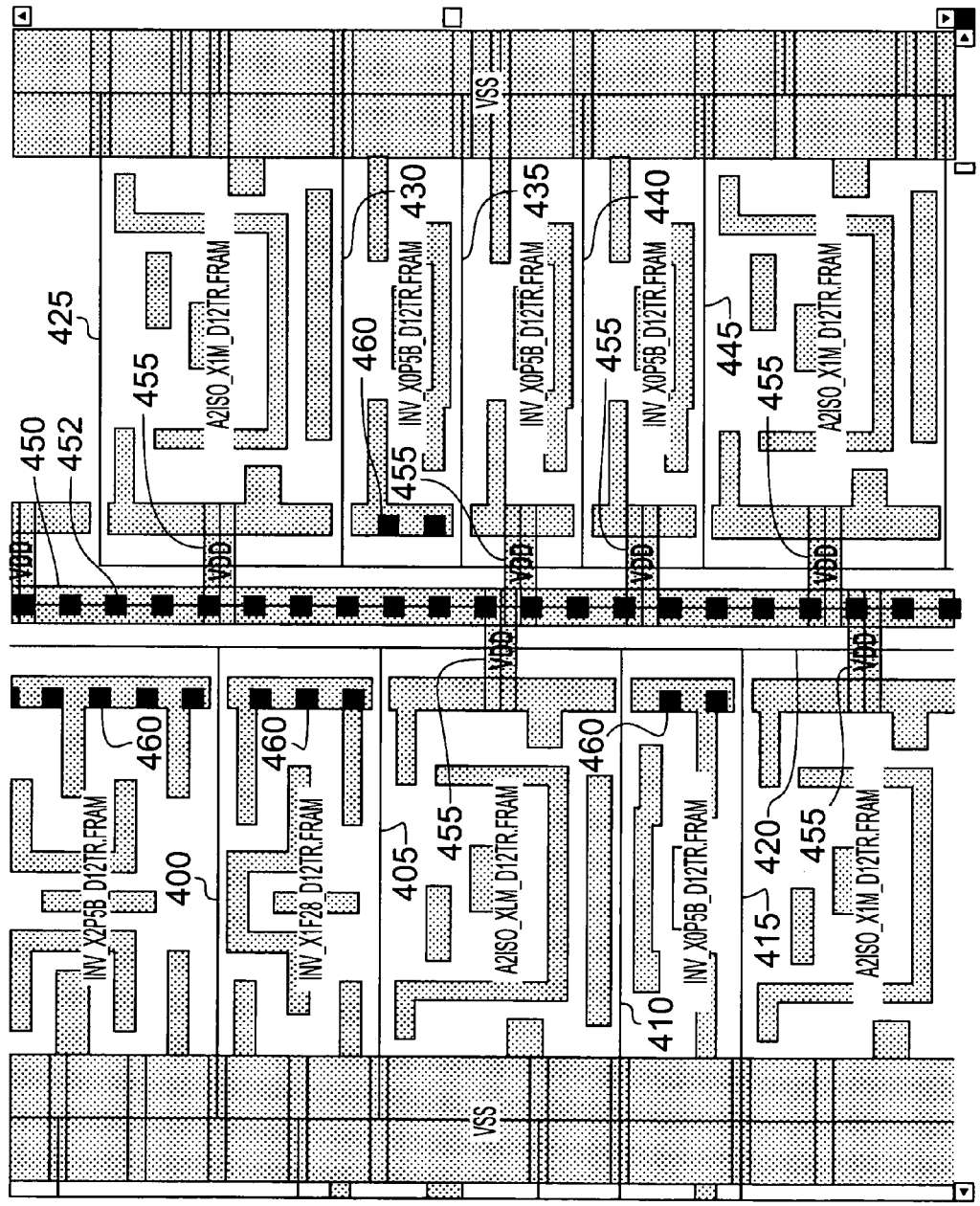
FIG. 5 illustrates two rows of standard cells each having voltage connection areas in accordance with one embodiment.

FIG. 5 illustrates a portion of an actual layout constructed using the techniques described earlier. In particular, one row contains the standard cells 425, 430, 435, 440, 445, whilst an adjacent row provides the standard cells 400, 405, 410, 415, 420. An intervening metal one layer 450 is provided between the rows, which is connected by a sequence of vias 452 to an overlying metal two layer. Collectively, the metal one layer 450 and its overlying metal two layer provide one voltage supply, and in this example the standard cells 425, 435, 440, 445, 410 and 420 are connected to this voltage supply via the metal one ties 455. In contrast, the cells 430, 400, 405 and 415 have their power connection areas coupled by vias 460 to an overlying metal two rail providing a different voltage supply.

It will be appreciated that the above described techniques provide a great deal of flexibility as to how individual standard cells within a row are connected to a voltage supply. Such flexibility provides significant benefits in many areas of circuit layout design by significantly easing the constraints which would otherwise be placed upon the design and layout tool when positioning standard cells within the rows.

Figure 6:
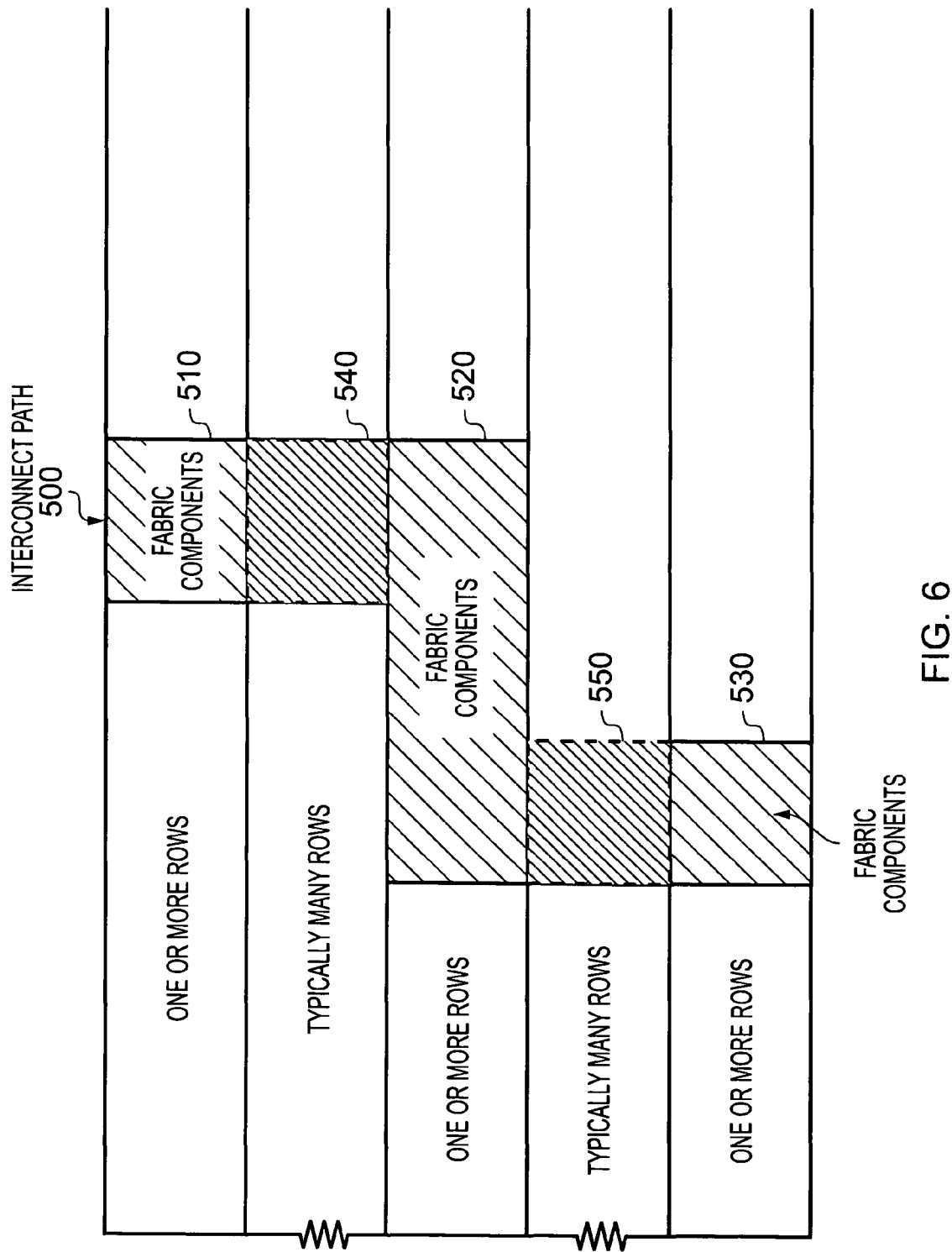
FIG. 6 schematically illustrates how the interconnect components of an interconnect path can be distributed across an integrated circuit in accordance with one embodiment.

One type of structure which has been traditionally difficult to provide a dedicated power supply to is an interconnect structure, which comprises a plurality of interconnect components which ideally need to be placed in a distributed manner across the integrated circuit in order to meet the timing constraints of the interconnect path. FIG. 6 shows such an interconnect path 500 consisting of a first set of interconnect components 510 in one or more rows, a second set of interconnect components 520 in another one or more rows typically spaced from the first interconnect components by many rows, and similarly a third set of interconnect components 530 in one or more rows typically separated by many rows from the second set of interconnect components 520. A number of wires will typically run between the various blocks of interconnect components 510, 520, 530 in the intervening areas 540, 550. The interconnect components 510, 520, 530 can take a variety of forms, for example registers, buffers, etc.

In a typical prior art system, if it was desired to provide for example a particular switched supply to the interconnect components forming at least one channel of the interconnect path 500, it would typically be necessary to group the required components together in a monolithic voltage area that could be provided with the required voltage supply. However, for the example of an interconnect, it is often impractical to do this, since it is difficult to meet the timing requirements for signals passing over the interconnect if the physical separation between blocks of the interconnect components is too great. However, when using the above described techniques, such constraints are removed, and instead the interconnect components 510, 520, 530 can be placed within the rows of the integrated circuit purely having regard to the timing constraints, whilst still being able to power gate the interconnect path 500 even though those interconnect components are distributed across various rows that are quite distant from one another. In particular, the interconnect components can be placed in rows with components using other power domains, since through use of the voltage connection areas of the described embodiments, the power domains can be disaggregated, and in particular individual components within a row can be connected to power supplies quite different to the power supplies provided to other components within the row.

Figure 7:
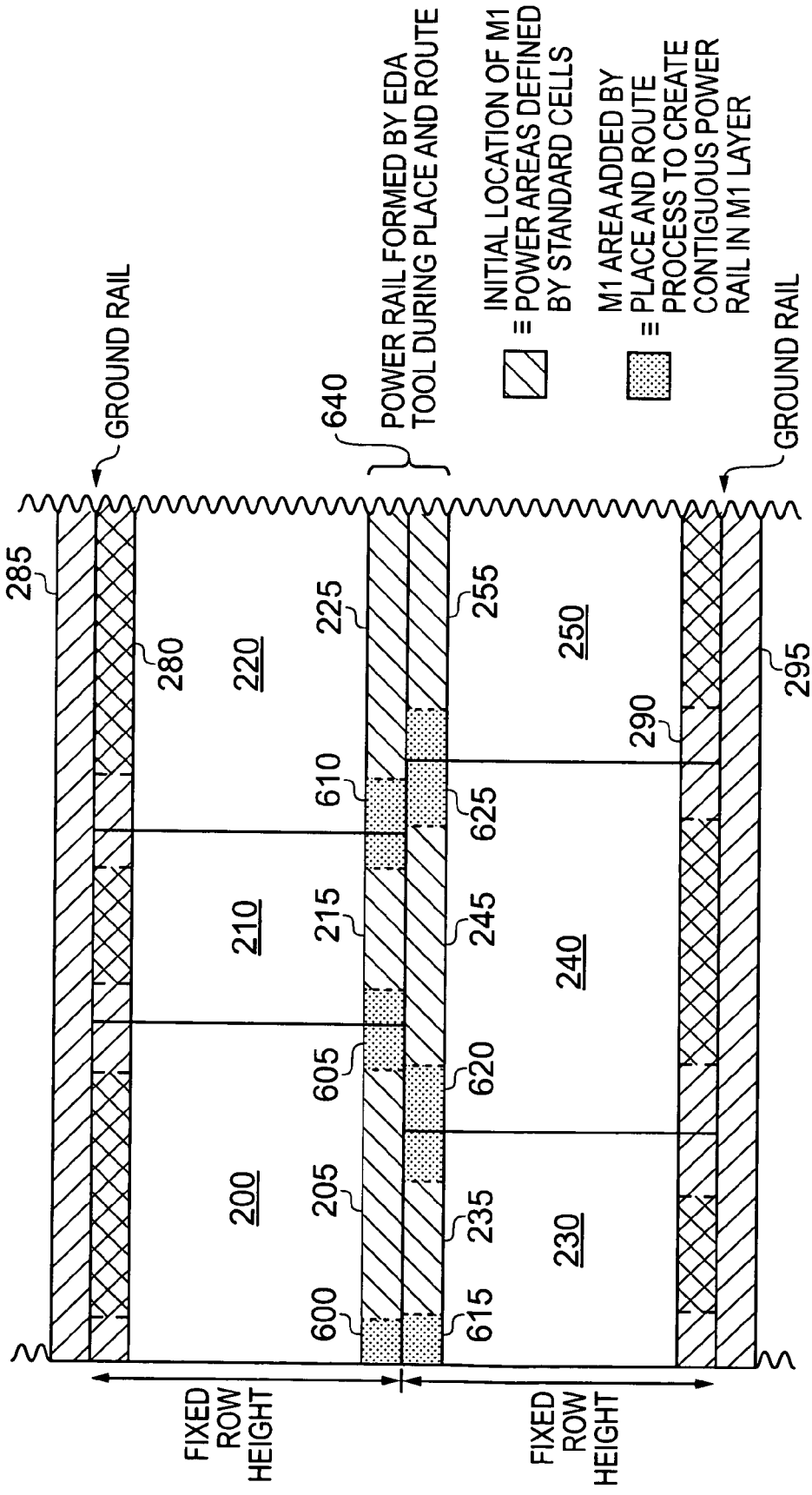
FIG. 7 illustrates how the standard cells of one embodiment can be used to support backward compatibility where each row of cells has a continuous power rail and a continuous ground rail.

FIG. 7 is a diagram illustrating how the standard cells of the described embodiment still support backwards compatibility with standard designs using power and ground rails. In particular, FIG. 7 shows the same series of standard cells in two adjacent rows as shown in FIG. 3, but in this example there is no need for the intervening power rail 270, and accordingly no need for a gap between the adjacent rows. Instead, during the layout process, additional metal one areas 600, 605, 610, 615, 620, 625 are added by the place and route process to form, in combination with the voltage connection areas 205, 215, 225, 235, 245, 255, a contiguous power rail 640. The formation of the ground rails 280, 285 and 290, 295 takes place in exactly the same way.

Accordingly, if a library of de-railed standard cells such as the standard cells shown in FIGS. 2A and 2B are provided, it is still possible to provide layouts conforming to the traditional designs where contiguous power and ground rails are provided within the rows. However, as described earlier, one or both of the voltage connection areas used for the power supply and the ground can be left de-railed to facilitate the flexible connection of voltage supplies as discussed with reference to the previous figures.

In the example of FIG. 3, two separate power supplies are provided, and connections to those two different power supplies can occur either by a tie in the M1 layer or by a via in the M2 layer, i.e. by conductive connectors that extend in perpendicular directions to each other. In some embodiments, it may be desirable to provide more than two voltage supplies for connection selectively to the individual voltage connection areas. In one embodiment, all such voltage supplies could be provided by rails extending in the gap between adjacent rows, but typically, for space efficiency reasons, it will be desirable to provide one of those voltage supplies by metal two rails directly overlaying the voltage connection areas.

Figure 8:
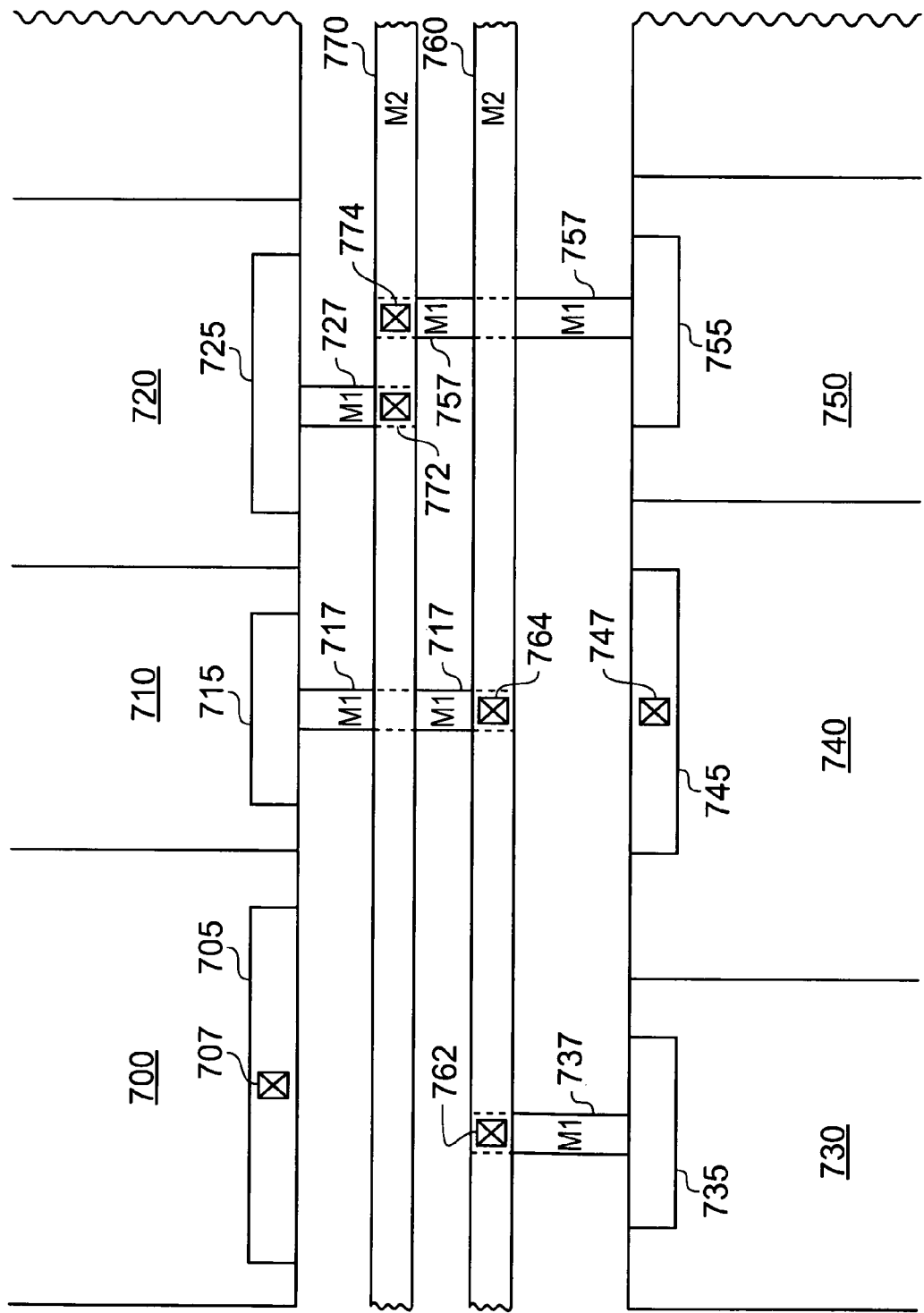
FIG. 8 illustrates one embodiment where multiple intervening voltage rails are placed in the gap between two adjacent rows.

FIG. 8 shows one embodiment where in addition to metal two rails overlying the voltage connection areas 705, 715, 725 of the standard cells 700, 710, 720 and overlying the connection areas 735, 745, 755 of the standard cells 730, 740, 750, a plurality of further voltage supply rails 760, 770 are provided in the metal two layer in the gap between the rows. To connect to these different voltage rails 760, 770, conductive connectors are provided which at least partially use ties in the metal one layers, but which additionally require vias to make the final connection to the relevant metal two layer. Hence, the voltage connection area 735 is connected to the metal two rail 760 by a metal one tie 737 and a via 762. Similarly, the voltage connection area 715 is connected to the metal two rail 760 by the metal one tie 717 and a via 764. In addition, the voltage connection area 725 is connected to the metal two rail 770 by the metal one tie 727 and the via 772, whilst the voltage connection area 755 is also connected to the metal two rail 770 by the metal one tie 757 and the via 774. In contrast, the voltage connection area 705 and 745 are connected to overlying metal two voltage supplies simply by using the vias 707, 747. To improve current carrying capacity, multiple vias can be used if necessary.

As the device size geometry has decreased within integrated circuits, a significant problem that arises is the power consumed due to leakage currents. Such leakage currents arise even when the integrated circuit is in a retention mode in which active data processing is not performed. In order to address the problems of leakage current, it is known to utilise power gating. Using the above described techniques, there is a great deal of flexibility in choosing whether to connect any individual standard cell to a power gated voltage supply or to an always on voltage supply.

One problem that may occur during power gating is that the time taken to restart processing operations may be comparatively large, since the signal nodes and power/signal lines within the portion of the integrated circuit which has been isolated from the power supply will need to recharge to their starting levels before processing can be restarted. Furthermore, there may be problems such as crowbar currents in which a significant amount of power is consumed by gates pulling single nodes in opposite directions until a proper starting state has been reached.

One way of dealing with these problems within integrated circuits using power gating is to provide what is termed "zig-zag" power gating. Zig-zag power gating is a leakage mitigation technique where a predetermined logic state (sleep vector) is applied to a design in the retention mode, and then all leaking pull up/pull down stacks of gates are disconnected from one of the power or ground supplies using distributed power gates. The signal nodes are maintained at their proper values as they remain connected to the appropriate power rail (either power or ground) but the leaking pull up or pull down stacks are disconnected from one of the power rails thereby reducing leakage through the stack. This allows for a quicker turn on time since the logic levels are maintained. Furthermore, as no charging or discharging of nodes or signal capacitance is required, and no crowbar currents arise, power consumption upon start up is reduced.

Figure 9:
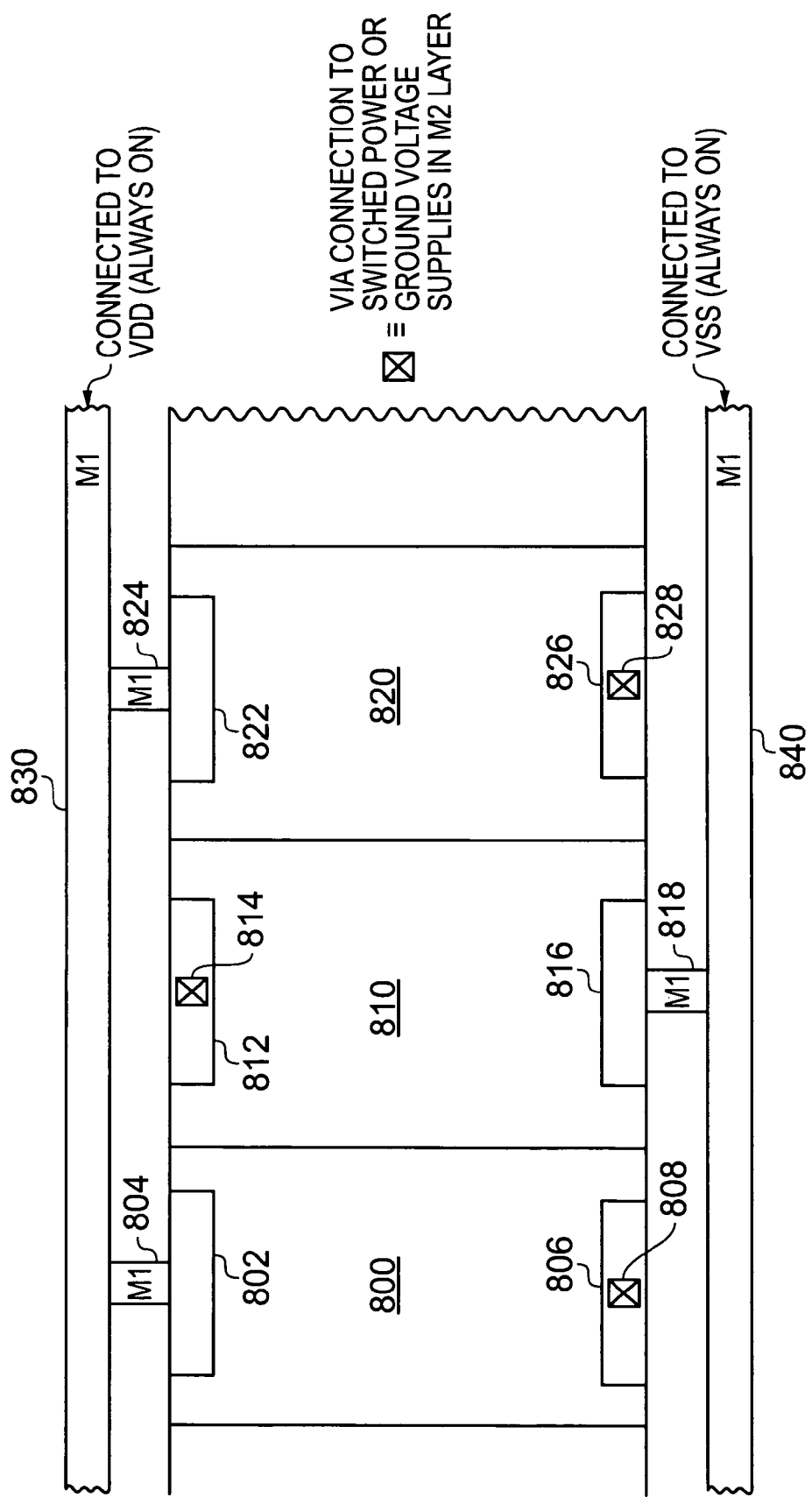
FIG. 9 illustrates one embodiment where both switched and always on versions of both power and ground supplies are provided, and individual cells are connected to selected power and ground supplies independent of the power and ground supplies provided to adjacent cells.

When adopting the above described techniques using de-railed standard cells, such zig-zag power gating can be readily supported. In particular, by distributing switched power and ground and always-on power and ground, it is possible to optimise the power connections to every cell in the design for a particular resting state where the leakage path is cut off but logic levels are maintained. FIG. 9 schematically illustrates this approach where the metal one rails between adjacent rows 830, 840 provide an always-on power supply and an always-on ground supply, respectively, whilst an overlying metal two rail aligned with the voltage connection areas 802, 812, 822 provides a switched power supply, and a metal two rail overlying the voltage connection areas 806, 816, 826 provides a switched ground supply. As can be seen, the standard cell 800 and the standard cell 820 can be arranged to have their voltage connection areas 802, 822 connected to the always-on power supply whilst their other voltage connection areas 806, 826 are connected to the switched ground supply. In contrast, the standard cell 810 has its voltage connection area 812 connected to the switched power supply by a via 814, whilst its other voltage connection area 816 is connected by the metal one tie 818 to the always-on ground supply provided by the metal one rail 840.

It will be appreciated that in FIG. 9 the always-on and switched supplies can be swapped if required, so that the metal one rails 830, 840 provide the switched supplies and the metal two layers aligned above the voltage connection areas provide the always-on power and ground supplies. It will also be appreciated that there is no need for strict alternation of connections between each adjacent standard cell as shown in FIG. 9, since how each individual cell needs to be connected will depend in practice on how the cells are electrically connected to each other.

Figure 10:
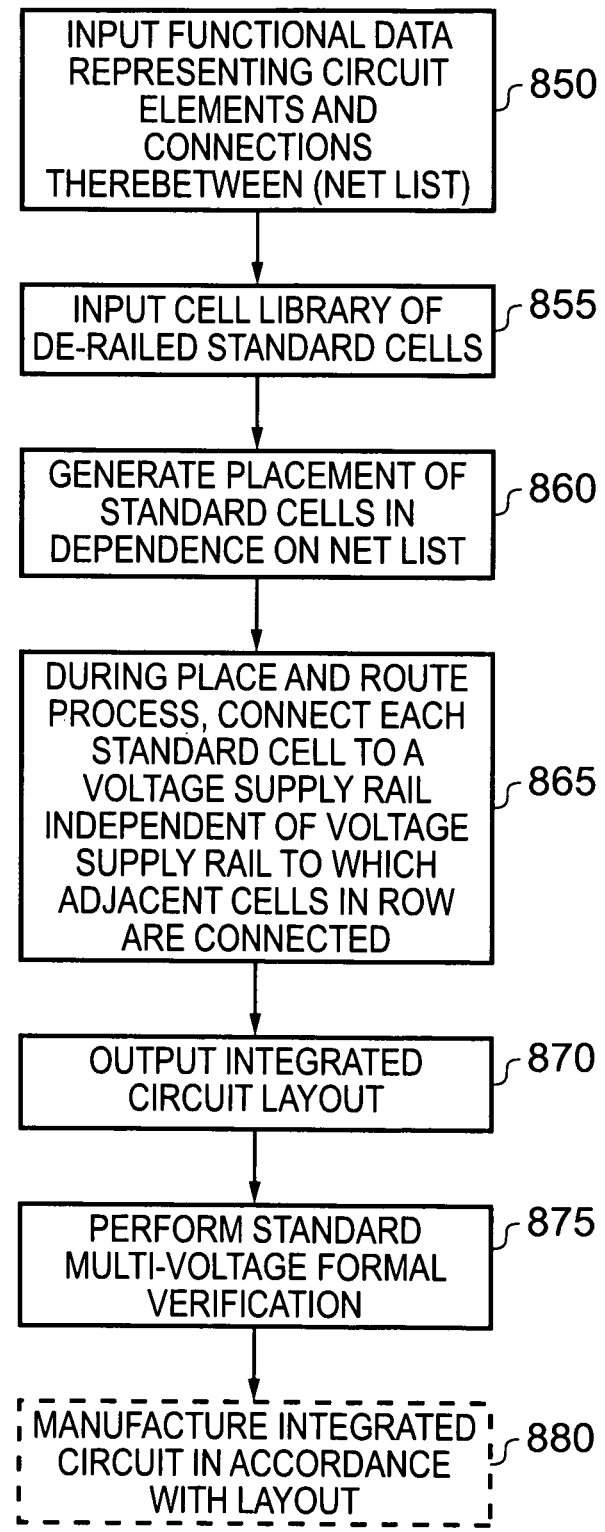
FIG. 10 is a flow diagram illustrating a method in accordance with one embodiment.

FIG. 10 is a flow diagram illustrating a method of generating a layout of an integrated circuit in accordance with the above described techniques. Firstly, at step 850, functional data representing circuit elements and connections between the circuit elements of the planned integrated circuit are input, typically in the form of a net list. Next at step 855, a cell library is input, the cell library defining a plurality of de-railed standard cells as discussed earlier.

At step 860, a placement of standard cells is generated in dependence on the functional data (net list) so as to place the cells in a sequence of rows. At step 865, during the place and route process, each standard cell is connected to a voltage supply rail having regard to a voltage requirement of the corresponding functional component defined by that standard cell, and independent of the voltage supply rail to which adjacent cells in the row are connected. Then, at step 870 the generated integrated circuit layout is output. Outputting this generated integrated circuit layout can take a variety of forms, but it will typically be recorded as layout data on a computer readable medium.

The layout data output at step 870 can be considered to be a power-aware net list of the integrated circuit design input at step 850. At step 875, standard multi-voltage formal verification tests will typically be performed, to ensure that the place and route process performed during steps 860 and 865 has not introduced any unexpected anomalies. Such a verification step can use the same standard verification tests when the integrated circuit design is generated using the de-railed standard cells of the above described embodiments as would be used were traditional (non-derailed") standard cells used in the design.

As shown by the dotted box 880, the process can then continue with the manufacture of the integrated circuit in accordance with the layout output at step 870.

Figure 11:
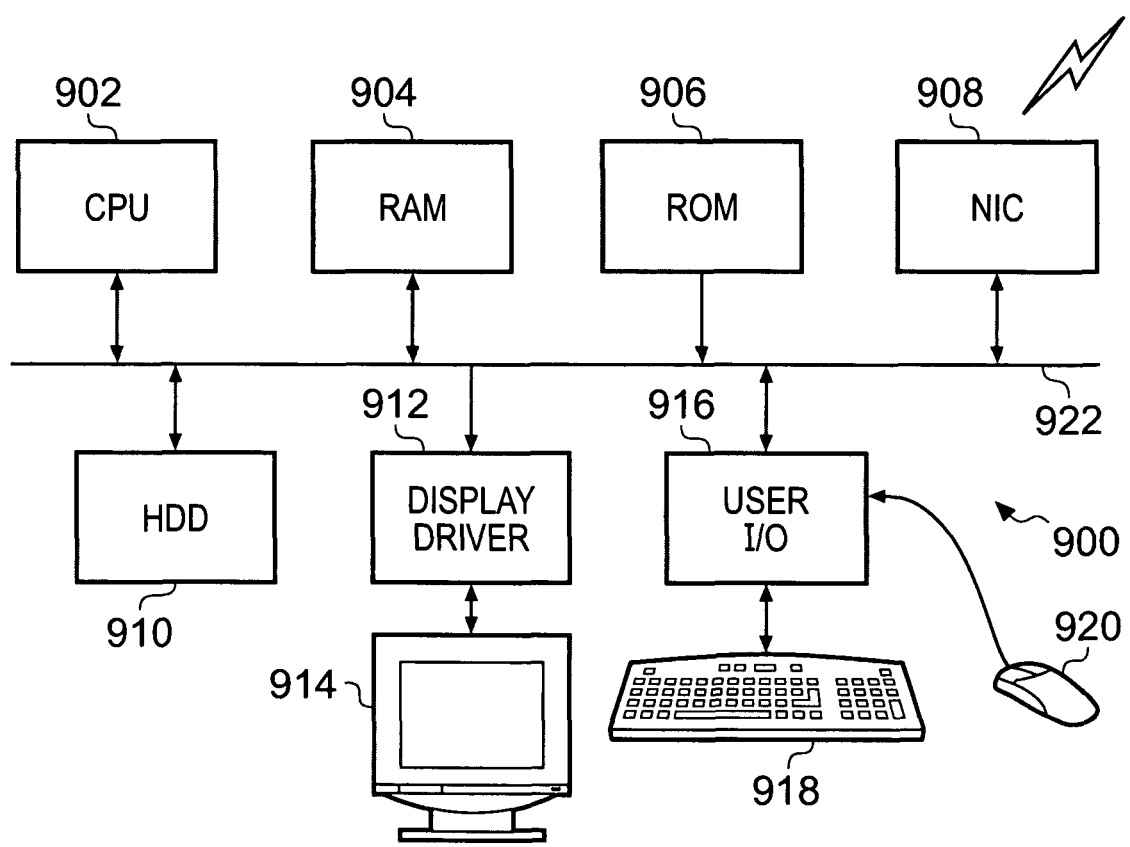
FIG. 11 schematically illustrates a general purpose computer of the type which can be used to implement the present techniques.

FIG. 11 schematically illustrates a general purpose computer 900 of the type that may be used to implement the above described techniques, and in particular the generation of a layout of an integrated circuit. The general purpose computer 900 includes a central processing unit 902, a random access memory 904, a read-only memory 906, a network interface card 908, a hard disk drive 910, a display driver 912 and monitor 914, and a user input/output circuit 916 with a keyboard 918 and mouse 920 all connected via a common bus 922. In operation the central processing unit 902 will execute computer program instructions that may be stored in one or more of the random access memory 904, the read-only memory 906 and the hard disk drive 910, or dynamically downloaded via the network interface card 908. The results of the processing performed may be displayed to a user via the display driver 912 and the monitor 914. User inputs for controlling the operation of the general purpose computer 900 may be received via the user input/output circuit 916 from the keyboard 918 or the mouse 920. It will be appreciated that the computer program could be written in a variety of different computer languages. The computer program may be stored and distributed on a recording medium or dynamically downloaded to the general purpose computer 900. When operating under control of an appropriate computer program, the general purpose computer 900 can perform the above described techniques and can be considered to form an apparatus for performing the above described techniques. The architecture of the general purpose computer 900 could vary considerably, and FIG. 11 is only one example.

It will be appreciated from the above described embodiments that the use of the described de-railed standard cells provides significantly improved flexibility with regards to the placement of standard cells within an integrated circuit, whilst allowing coupling of the required voltage supply to each standard cell independently of the voltage supply provided to adjacent standard cells in the row. In addition to the specific examples already discussed, in one embodiment the techniques can be used to provide for selective overdrive of certain components. In particular, rather than increasing the voltage to the whole design for a high performance mode, only those standard cells on possible critical paths could be voltage scaled. Conversely non-critical cells could be connected to a lower supply voltage. As another example, a secondary power grid could be reserved for standard cells on critical paths, while all other standard cells are connected to a primary noisy power grid. Such an approach would reduce supply bounce, and may allow margin reduction and/or higher parametric yield on critical paths. Such an approach will also limit the use of expensive on-chip voltage regulators.

Whilst the above described techniques will typically have a slight adverse effect on area, due to the need to provide space between adjacent rows to take intervening power rails, it has been found that such techniques can significantly reduce power consumption, which is becoming a more and more significant constraint in modern data processing systems: Further, as already described earlier with reference to FIG. 7, if area is a significant issue for a particular design (for example due to critical wire length), then the use of the de-railed standard cell architecture does not prevent traditional rail-based rows of cells being formed. A mixture of the two approaches could even be employed for different parts of a System-on-Chip.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A method of generating a layout of an integrated circuit, comprising the steps of:

forming a plurality of rows within which to provide functional components of the integrated circuit, each row having a predetermined row height;

providing a standard cell library, each standard cell within the standard cell library defining a corresponding functional component, each standard cell having an abutment area comprising a height dictated by the row height, and a width;

populating each row with a plurality of standard cells chosen in dependence on the functional components required by the integrated circuit, each standard cell having its abutment area abutting the abutment area of at least one adjacent standard cell in the row;

for each row, providing a routing track running along that row;

within each row, arranging for each standard cell in that row to have a voltage connection area that is aligned with said routing track, but with each standard cell in that row having said voltage connection area configured so as not to extend across the entire width of the standard cell;

providing a plurality of voltage supplies; and within each row, for each standard cell in said row, connecting the voltage connection area of that standard cell to one of the plurality of voltage supplies having regard to a voltage requirement of the corresponding functional component defined by that standard cell, and independent of the voltage supply to which each adjacent standard cell in the row is connected.

2. A method as claimed in claim 1, further comprising:

providing a plurality of conductive connector configurations, each conductive connector configuration having an associated voltage supply from said plurality of voltage supplies and facilitating a voltage connection between said voltage connection area and said associated voltage supply; and for each standard cell in said row, said connecting step comprising determining which voltage supply to connect to and using the associated conductive connector configuration to provide the voltage connection between the voltage connection area and said determined voltage supply.

3. A method as claimed in claim 2, wherein:

one voltage supply of said plurality of voltage supplies is positioned such that use of the associated conductive connector configuration results in a conductive connector extending between the voltage connection area and said one voltage supply in a first direction; and at least one other voltage supply of said plurality of voltage supplies is positioned such that use of the associated conductive connector configuration results in a conductive connector extending between the voltage connection area and that other voltage supply at least partially in a second direction orthogonal to the first direction.

4. A method as claimed in claim 3, wherein said first direction is perpendicular to a plane defined by the abutment area.

5. A method as claimed in claim 1, wherein each standard cell defines a plurality of layers including a first metal layer, and said voltage connection area is provided in said first metal layer, the method further comprising:

providing an intervening voltage rail in said first metal layer in a gap between a first row and a second row of said plurality of rows;

coupling a first voltage supply from said plurality of voltage supplies to said intervening voltage rail; and during said connecting step, connecting the voltage connection area of a standard cell to said first voltage supply by placing a conductive connector in said first metal layer between that voltage connection area and the intervening voltage rail.

6. A method as claimed in claim 5, further comprising:
providing a second voltage supply from said plurality of voltage supplies in a second metal layer separated from said first metal layer in a depth direction perpendicular to a plane defined by the abutment area; and
during said connecting step, connecting the voltage connection area of a standard cell to said second voltage supply by placing a conductive connector between the voltage connection area in the first metal layer and the second voltage supply in the second metal layer.

7. A method as claimed in claim 6, further comprising:
providing the second supply voltage by a voltage supply line running in the second metal layer aligned with said routing track; and
during said connecting step, creating at least one via to provide the conductive connector between the voltage connection area in the first metal layer and the second voltage supply in the second metal layer.

8. A method as claimed in claim 1, wherein each standard cell defines a plurality of layers including a first metal layer, and said voltage connection area is provided in said first metal layer, the method further comprising:
providing a plurality of intervening voltage rails in a second metal layer separated from said first metal layer in a depth direction perpendicular to a plane defined by the abutment area, said plurality of intervening voltage rails being positioned in a gap between a first row and a second row of said plurality of rows;
coupling a different voltage supply from said plurality of voltage supplies to each said intervening voltage rail; and
during said connecting step, connecting the voltage connection area of a standard cell to one of said intervening voltage rails by using a conductive connector that partially extends in said first metal layer into said gap between said first row and said second row.

9. A method as claimed in claim 1, further comprising:
providing a plurality of standard cells across multiple of said rows to collectively implement at least one channel of an interconnect structure within the integrated circuit; and
connecting each of those standard cells implementing the at least one channel to the same voltage supply from said plurality of voltage supplies.

10. A method as claimed in claim 1, wherein said plurality of voltage supplies provide multiple different voltage levels.

11. A method as claimed in claim 1, wherein said plurality of voltage supplies comprise both an unswitched version and at least one switched version of a particular voltage level.

12. A method as claimed in claim 1, wherein said plurality of voltage supplies provide one of a plurality of power supplies and a plurality of ground supplies.

13. A method as claimed in claim 1, further comprising:
for each row, providing an additional routing track running along that row;
within each row, arranging for each standard cell in that row to have an additional voltage connection area that is aligned with said additional routing track, but with each standard cell in that row having said additional voltage connection area configured so as not to extend across the entire width of the standard cell;
providing a plurality of additional voltage supplies; and
within each row, for each standard cell in said row, connecting the additional voltage connection area of that standard cell to one of the plurality of additional voltage supplies having regard to a voltage requirement of the corresponding functional component defined by that standard cell, and independent of the additional voltage supply to which each adjacent standard cell in the row is connected.

14. A method as claimed in claim 13, wherein said plurality of voltage supplies provide a plurality of power supplies and said plurality of additional voltage supplies provide a plurality of ground supplies.

15. A method as claimed in claim 1, wherein:
at least one standard cell in at least one of said plurality of rows is arranged to have a further voltage connection area separated from but aligned with said voltage connection area, such that said voltage connection area and said further voltage connection area are both aligned with said routing track;
for each of said at least one standard cells, the further voltage connection area is connected to a different one of the plurality of voltage supplies to the voltage supply connected to the voltage connection area of that standard cell.

16. A non-transitory computer readable storage medium storing a standard cell library, said library comprised of a plurality of standard cells and said standard cell library can be accessed by a general purpose computer programmed to perform the method of claim 1.

17. A computer program product including a non-transitory computer readable storage medium storing a program which, when implemented on a general purpose computer, will perform the steps of the method of claim 1.

18. An integrated circuit comprising:
a plurality of voltage supplies;
a plurality of rows of functional components, each row having a row height and having its functional components defined by a corresponding series of standard cells, each standard cell having an abutment area comprising a height dictated by the row height, and a width, and each standard cell having its abutment area abutting the abutment area of at least one adjacent standard cell in the row;
a routing track provided for each row and running along that associated row;
within each row, each standard cell having a voltage connection area that is aligned with said routing track, but with each standard cell in that row having said voltage connection area configured so as not to extend across the entire width of the standard cell; and
within each row, for each standard cell in said row, the voltage connection area of that standard cell being connected to one of the plurality of voltage supplies having regard to a voltage requirement of the corresponding functional component defined by that standard cell, and independent of the voltage supply to which each adjacent standard cell in the row is connected.

19. An integrated circuit comprising:
a plurality of voltage supply means;
a plurality of rows of functional means, each row having a row height and having its functional means defined by a corresponding series of standard cell means, each standard cell means having an abutment area comprising a height dictated by the row height, and a width, and each standard cell means having its abutment area abutting the abutment area of at least one adjacent standard cell means in the row;
routing track means provided for each row and running along that associated row;

within each row, each standard cell means having a voltage connection area means aligned with said routing track means, but with each standard cell means in that row having said voltage connection area means configured so as not to extend across the entire width of the standard cell means; and within each row, for each standard cell means in said row, the voltage connection area means of that standard cell means for connecting to one of the plurality of voltage supply means having regard to a voltage requirement of the corresponding functional means defined by that standard cell means, and independent of the voltage supply means to which each adjacent standard cell means in the row is connected.

* * * * *